D. C. COLBY.
COFFEE CAN AND CRUSHER.

No. 65,474. Patented June 4, 1867.

Witnesses:
Jn. D. Pitten
Charles C. Wilson

Inventor:
Daniel C. Colby

United States Patent Office.

DANIEL C. COLBY, OF WASHINGTON, DISTRICT OF COLUMBIA.

Letters Patent No. 65,474, dated June 4, 1867.

---

IMPROVED COFFEE-CAN AND CRUSHER.

---

The Schedule referred to in these Letters Patent and making part of the same.

---

TO ALL WHOM IT MAY CONCERN:

Be it known that I, DANIEL C. COLBY, of Washington, District of Columbia, have invented new and useful improvements in Coffee-Cans with Mill Attachment; and I do hereby declare the following to be a full and exact description of the same, reference being had to the drawings that accompany and form a part of these specifications, in which—

Figure 1:
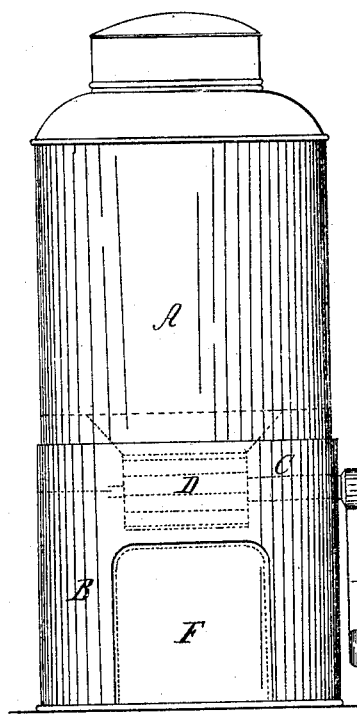

Figure 1 is a front elevation of one style of manufacture.

Figure 2:
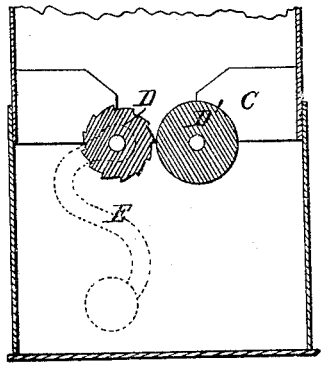

Figure 2, sectional view of a portion of that shown in fig. 1.

Figure 3:
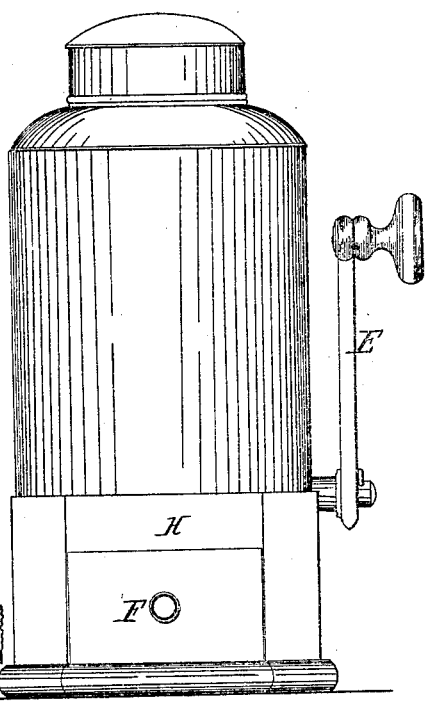

Figure 3, front elevation of another style of base.

Figure 4:
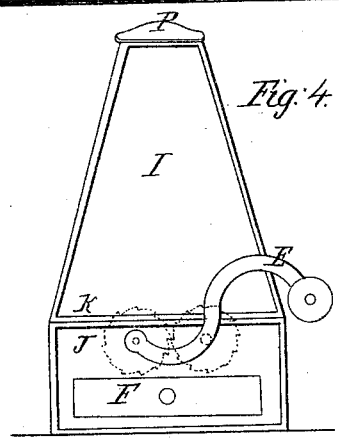

Figure 4, view of still another style of attaching upper and lower parts.

Letter A, coffee-canister or holder; letter B, base of the canister; letter C, partition so placed as to allow the attachment of suitable crushing or grinding apparatus as in fig. 2; letters D and D', two rollers between which the coffee is crushed; F, chamber between for the reception of the ground coffee; letter H, a different style of base; letters I and J, upper and lower parts of a coffee-canister or holder made of wood; K, a block answering the double purpose of connecting the parts I and J, and sustaining the rollers D and D'.

The object of my invention is to provide a suitable coffee-canister for family use, for the close keeping of a quantity of roasted coffee berries, with a grinding or crushing attachment, thus securing in one and the same household article a coffee-canister and mill, so that the various forms of coffee-mills heretofore in use may be dispensed with.

The drawings will sufficiently illustrate the various forms of structure and arrangement of parts. Preferable material for the style shown in figs. 1 and 3 would be malleable castings of iron for the base with upper part of sheet tin. Fig. 4 shows a design of one all wood, the top piece or cap P being hinged as a cover for the convenience of pouring in the roasted coffee.

I do not claim any feature in the grinding-rollers or any part of that which constitutes the grinding or crushing-mill as belonging to this invention. Preference, however, is given to the one fluted and one plane roller, as in fig. 2, as producing a crushing rather than a grinding, and a consequent better flavor to the prepared coffee. If, however, two grooved or fluted rollers are used, they should be arranged as indicated by the red dotted lines in fig. 4.

The great convenience of this combined coffee-canister and mill as being more readily at hand for use, and its adaptability for preserving the aroma of the coffee, can hardly be over-estimated.

What I claim as of my invention, and desire to secure by Letters Patent, is—

Combining with a coffee-canister, a grinding or crushing device of any desired structure, substantially as described and set forth.

DANIEL C. COLBY.

Witnesses:
CHRISTOPHER MAEGLING,
C. H. BAKER.